(12) United States Patent
Chirumbolo

(10) Patent No.: US 7,651,179 B2
(45) Date of Patent: Jan. 26, 2010

(54) DEVICE FOR AUTOMATIC EXTRACTION OF A DRAWER, IN PARTICULAR A SUPPLY DRAWER FOR A HOUSEHOLD APPLIANCE SUCH AS A WASHING MACHINE

(75) Inventor: Dino Chirumbolo, Settimo Torinese (IT)

(73) Assignee: ITW Industrial Components SRL Con Unico Socio, Milan (IT)

( * ) Notice: Subject to any disclaimer, the term of this patent is extended or adjusted under 35 U.S.C. 154(b) by 0 days.

(21) Appl. No.: 11/433,588

(22) Filed: May 15, 2006

(65) Prior Publication Data
US 2006/0261717 A1    Nov. 23, 2006

(30) Foreign Application Priority Data
May 17, 2005 (IT) .......................... TO2005A0332

(51) Int. Cl.
*A47B 95/02* (2006.01)
(52) U.S. Cl. ................................. 312/319.1; 312/330.1
(58) Field of Classification Search ............. 312/330.1, 312/319.1; 74/422, 411.5
See application file for complete search history.

(56) References Cited

U.S. PATENT DOCUMENTS

| 4,466,449 | A | * | 8/1984 | Summers ..................... 131/237 |
| 4,494,806 | A | * | 1/1985 | Williams et al. ............ 312/333 |
| 4,550,470 | A | * | 11/1985 | Omata ............................ 16/85 |
| 4,576,252 | A | * | 3/1986 | Omata .......................... 185/39 |
| 4,586,761 | A | * | 5/1986 | Shimbara ................. 312/319.1 |
| 4,602,828 | A | | 7/1986 | Omata |
| 4,660,881 | A | | 4/1987 | Komeya et al. |
| 4,828,344 | A | | 5/1989 | Omata |
| 2002/0096405 | A1 | * | 7/2002 | Gasser ...................... 188/82.1 |
| 2006/0214547 | A1 | * | 9/2006 | Bonner et al. ............ 312/319.5 |

FOREIGN PATENT DOCUMENTS

EP    1403415 A2    3/2004

* cited by examiner

*Primary Examiner*—Hanh V Tran
(74) *Attorney, Agent, or Firm*—Lowe Hauptman Ham & Berner LLP

(57) ABSTRACT

A device, for automatic extraction of a supply drawer from a household appliance, includes a releasable locking device for releasably locking the drawer; an elastic element for pushing the drawer into an extracted position; a braking element for opposing movement of the drawer; a support housing the elastic and the braking elements; and a toothed pinion fitted idly to the support, which is configured to leave at least one given circumferential portion of the teeth of the pinion exposed. The elastic element is to exert a torque in a given direction on the pinion, which is connected angularly integral with the braking element. The exposed circumferential portion of the pinion teeth meshes selectively with a straight or curved rack, formed externally on a wall of the drawer, by simply rotating the support with respect to the drawer, so that the same device can be used for both slide-out and swing-out drawers.

13 Claims, 2 Drawing Sheets

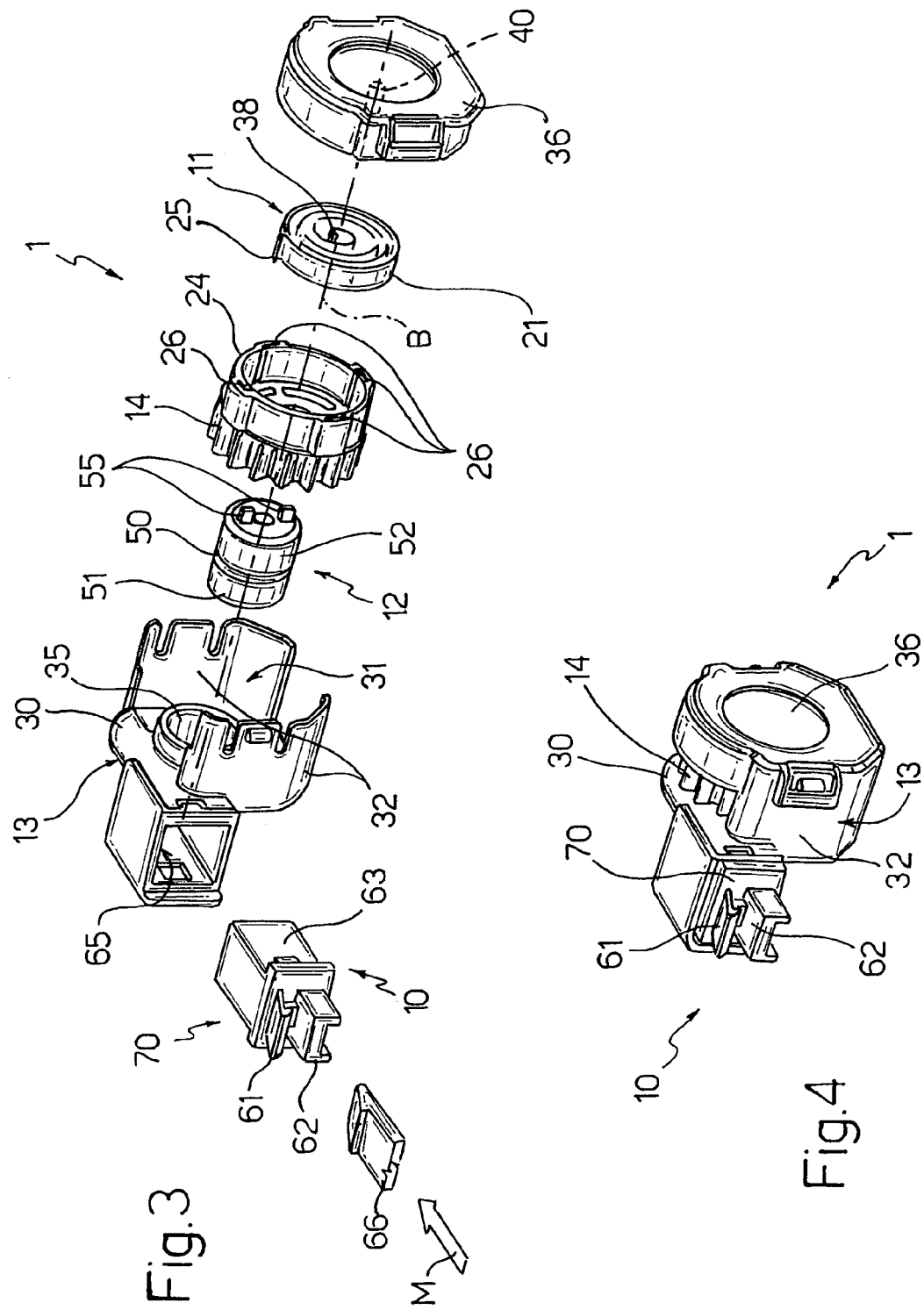

DEVICE FOR AUTOMATIC EXTRACTION OF A DRAWER, IN PARTICULAR A SUPPLY DRAWER FOR A HOUSEHOLD APPLIANCE SUCH AS A WASHING MACHINE

RELATED APPLICATIONS

The present application is based on, and claims priority from, Italian Application Number TO2005A 000332, filed May 17, 2005, the disclosure of which is hereby incorporated by reference herein in its entirety.

FIELD OF THE INVENTION

The present invention relates to an improved device for automatic extraction of a drawer from a household appliance, in particular the detergent and/or other laundry fluid supply drawer from its seat in a washing machine.

BACKGROUND OF THE INVENTION

European Patent Application n. 1403415 describes a device for slowly extracting a slide-out supply drawer of a washing machine from its seat by the user simply applying manual pressure on the front of the drawer. The drawer is restored to a withdrawn position inside the seat by the user again simply applying manual pressure on the front, and is locked in the withdrawn position until pressure is again applied on the front.

Though satisfactory in terms of operation, the device described in the above European patent application, filed by the present Applicant, is relatively bulky and relatively expensive by employing specially designed component parts. Moreover, the component parts, especially those for selectively locking the drawer in the withdrawn position, must be totally redesigned for the device to be used on swing-out as opposed to slide-out drawers.

SUMMARY OF THE INVENTION

It is therefore an object of the present invention to eliminate the aforementioned drawbacks by providing an improved device, for automatic extraction of a drawer from a household appliance, which device is compact and, above all, can be applied, with no alterations required, to both slide-out drawers, which slide straight out of the seat in the household appliance, and swing-out drawers, which swing out of the seat in the household appliance by rotating about an axis perpendicular to the drawer plane.

According to the present invention, there is provided a device for automatic extraction of a drawer from a seat, in which the drawer is normally housed invisibly in a withdrawn position, and in particular for extracting a supply drawer from a household appliance, as claimed in the attached claims.

More specifically, the extracting device comprises a releasable locking device for locking the drawer in a withdrawn position; elastic means for pushing the drawer into an extracted position, in which the drawer projects at least partly from the seat; braking means for opposing movement of the drawer; a support housing the elastic means and the braking means; and a toothed pinion fitted idly to the support, which is designed to leave at least one predetermined circumferential portion of the teeth of the pinion exposed. The elastic means exert a torque in a predetermined direction on the pinion, which is functionally connected to the braking means. And, according to one aspect of the invention, the pinion is angularly integral with the braking means, and the support is designed so that, by simply rotating the support with respect to the drawer, the exposed circumferential portion of the teeth of the pinion selectively meshes, respectively, with a straight or curved rack fitted, in use, externally integral with a bottom or end wall of the drawer, so that the same device can be used for both slide-out and swing-out drawers.

The releasable locking device comprises two jaws; and a push-push mechanism for selectively opening and closing the jaws, and which is activated in a direction perpendicular to the axis of rotation of the pinion, and is housed in a transverse seat in a supporting portion of the support. The drawer has an integral catch which, when the drawer is in the withdrawn position, is inserted between the jaws to activate the push-push mechanism and so be selectively gripped/released by the jaws.

According to a further aspect of the invention, the elastic means comprise a metal strip made of elastic material and substantially coiled about the axis of rotation of the pinion, which is connected directly angularly integral with the braking means on a first side, and is connected directly integral with the elastic means on a second side opposite the first side.

A highly compact and low bulk extracting device is thus achieved, and which, above all, can be used, with no alterations, for both slide-out and swing-out drawers, by simply fitting the device to the appliance casing so that the axis of rotation of the pinion is parallel to the drawer plane (for slide-out drawers), or turned 90° so that the axis of rotation of the pinion is perpendicular to the drawer plane (for swing-out drawers), i.e. is parallel to the axis of rotation of the drawer.

BRIEF DESCRIPTION OF THE DRAWINGS

A non-limiting embodiment of the present invention will be described by way of example with reference to the accompanying drawings, in which:

FIGS. 3 and 4 show an exploded and assembled view in perspective, respectively, of the FIGS. 1 and 2 extracting device.

DETAILED DESCRIPTION OF THE INVENTION

Figure 1:
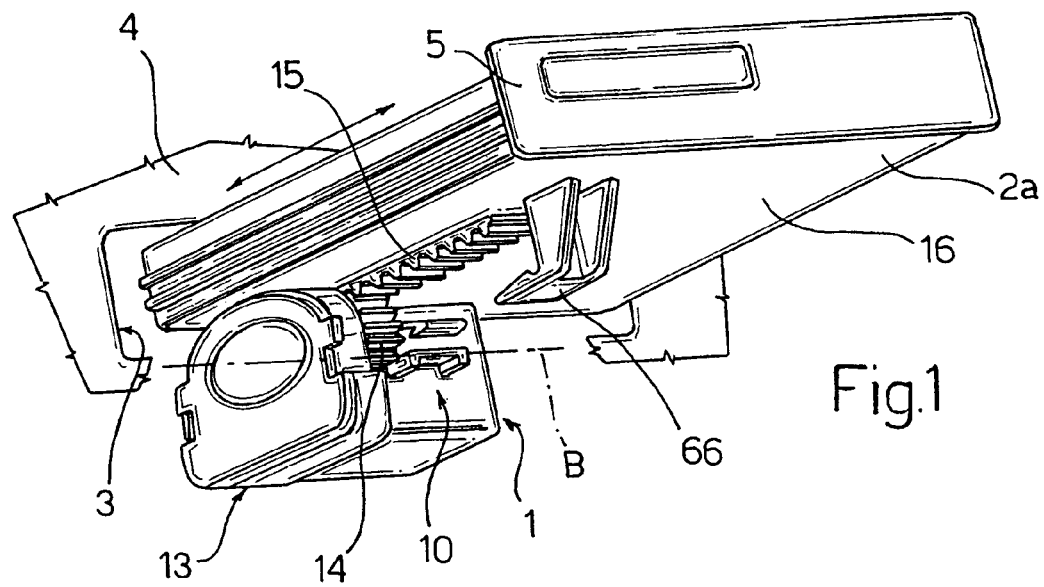
FIG. 1 shows a schematic, three-quarter, front underside view in perspective of a slide-out supply drawer of a household appliance, featuring the extracting device according to the invention.
Figure 2:
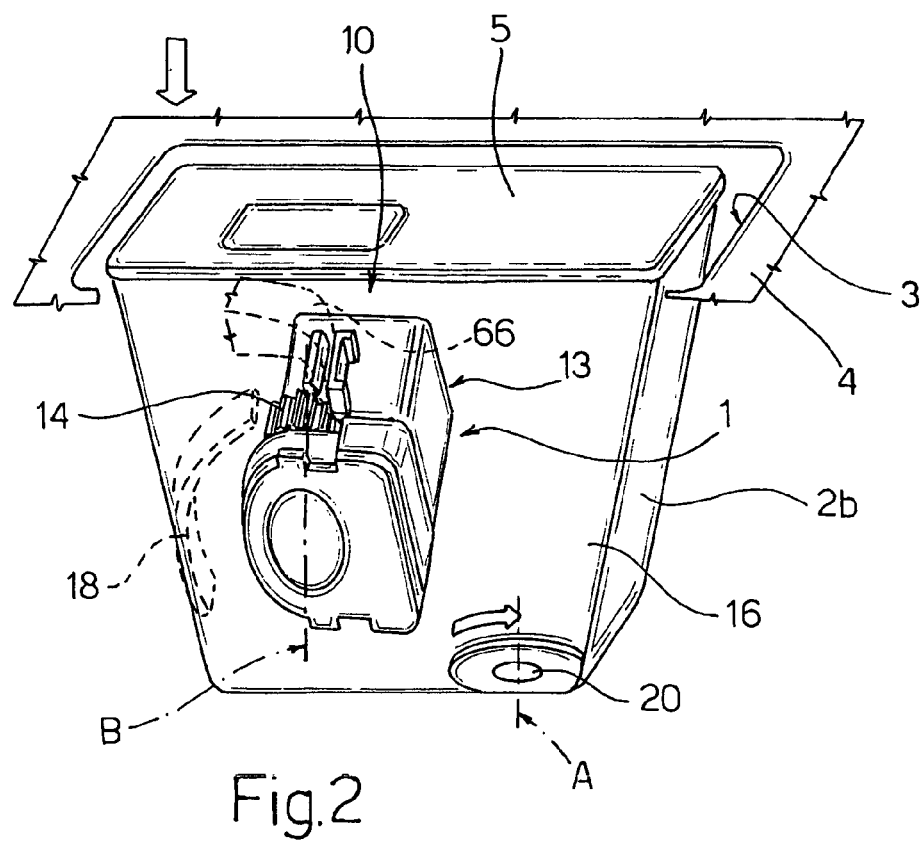
FIG. 2 shows a schematic, three-quarter, front underside view in perspective of a swing-out supply drawer of a household appliance, featuring the same extracting device according to the invention as in FIG. 1.

Number 1 in FIGS. 1 to 4 indicates as a whole a device for automatically extracting a drawer 2 from a seat 3 of a household appliance, and in which drawer 2 is normally housed invisibly in a withdrawn position shown in FIGS. 1 and 2. In the example shown, drawer 2 is a detergent and/or other laundry fluid (softener, bleach, etc.) supply drawer of a washing machine (of which only part of a casing 4 is shown for the sake of simplicity). In actual use, drawer 2 is extractable to project from seat 3 (in a known extracted position, not shown for the sake of simplicity, in which to fill drawer 2). When drawer 2 is in the withdrawn position, a front panel 5 of the drawer is substantially flush with and closes the mouth of seat 3 of the appliance.

Device 1 comprises a releasable locking device 10 for locking drawer 2 in the withdrawn position; elastic means 11 (FIG. 3) for pushing drawer 2 into the extracted position, in which drawer 2 projects at least partly from seat 3; braking means 12 (FIG. 3) for opposing movement of drawer 2; a support 13 (FIG. 3) housing elastic means 11 and braking means 12; and a toothed pinion 14 fitted idly to support 13, which is designed to leave at least one predetermined circumferential portion of the teeth of pinion 14 exposed.

As shown in detail in FIG. 3, elastic means 11 exert a torque in a predetermined direction on pinion 14, which is functionally connected to braking means 12. More specifically, according to the invention, pinion 14 is connected directly angularly integral with braking means 12, and support 13 is designed so that, by simply rotating support 13 with respect to drawer 2, the exposed circumferential portion of the teeth of pinion 14 selectively meshes with a known straight rack 15 (FIG. 1) or a known curved rack 18 (FIG. 2) fitted, in use, externally integral with a bottom or end wall 16 of drawer 2, so that the same device 1 can be used, according to the invention, for both a drawer 2a which slides out of seat 3, and a drawer 2b which swings out of seat 3 about a supporting pin 20 of axis A.

According to an equally important aspect of the invention, elastic means 11 comprise a metal strip 21 made of elastic material, e.g. music wire steel, and substantially coiled about an axis of rotation B of pinion 14.

In addition to employing a spring defined by a spiral strip 21 as the elastic means, which tests conducted by the Applicant's technicians have shown to be the only type ensuring reliable operation of device 1 with a small-volume spring, pinion 14, as stated, is connected directly angularly integral with braking means 12 on a first side, and is connected directly integral with elastic means 11 on a second side opposite the first side.

More specifically, the second side of pinion 14 is fitted with an axially projecting sleeve 24 (FIG. 3) coaxial with axis of rotation B of pinion 14 and housing coiled metal strip 21; and a radially outermost end 25 of metal strip 21 is bent radially outwards and engages in angularly integral manner a circumferential outer peripheral recess 26 of sleeve 24. In the example shown, sleeve 24 has four recesses 26, spaced angularly about 90° apart, to facilitate insertion of strip 21 inside sleeve 24 and angular connection of strip 21 to sleeve 24 and, therefore, to pinion 14, which is molded in one piece with sleeve 24 from synthetic plastic material.

Support 13 is also molded from synthetic plastic material and comprises: a substantially plate-like supporting portion 30 perpendicular to axis of rotation B of pinion 14 and facing the first side of pinion 14; a housing 31, for pinion 14, defined by two circumferentially spaced tabs 32 projecting, parallel to axis of rotation B of pinion 14, from supporting portion 30, on the same side as pinion 14, and between which pinion 14 is supported idly by supporting portion 30; an axial seat 35, for braking means 12, formed on supporting portion 30, on the same side as tabs 32; and a cover 36 which clicks onto tabs 32 into a position facing supporting portion 30 and on the opposite side of pinion 14 to supporting portion 30, so as to axially close housing 31 and sleeve 24.

A radially innermost end 38 of coiled metal strip 21 is bent radially inwards and engages cover 36 in angularly integral manner; and cover 36 is made angularly integral with supporting portion 30 by connection to tabs 32. More specifically, end 38 fits inside a projection 40 slotted parallel to axis B, formed in one piece with cover 36, and projecting axially from cover 36, from the face of cover 36 facing supporting portion 30 in use.

According to another aspect of the invention, braking means 12 comprise a standard commercial cylindrical braking device 50 of the type normally fitted coaxially with a hinge. More specifically, braking means 12 comprise two cylindrical members 51, 52 coaxial with axis of rotation B of pinion 14, and fitted to each other so as to rotate with respect to each other about axis B in opposition to a predetermined braking torque produced, for example, by a viscous fluid between members 51 and 52. Whichever the case, a first cylindrical member 51 is housed inside axial seat 35 of supporting portion 30, and a second cylindrical member 52 projects axially from axial seat 35 and engages pinion 14 in angularly integral manner, e.g. by means of end tabs 55.

According to another equally important aspect of the invention, releasable locking device 10 comprises two jaws 61, 62; and a push-push mechanism 63 for selectively opening and closing jaws 61, 62, and activated in a direction, indicated M in FIG. 3, perpendicular to axis of rotation B of pinion 14. More specifically, push-push mechanism 63 is housed in a transverse seat 65 forming one piece with supporting portion 30 of support 13, on the opposite side to tabs 32.

Drawer 2 has, in known manner, an integral catch 66 which, when both drawers 2a and 2b are in the withdrawn position (FIGS. 1 and 2), fits between jaws 61, 62 to activate push-push mechanism 63—which is known and therefore not described in detail for the sake of simplicity—and so be selectively gripped/released by jaws 61, 62.

According to the invention, the two jaws 61, 62 and push-push mechanism 63 for activating the jaws form a self-supporting unit 70—known for other uses—which, in the present application, clicks inside transverse seat 65 of supporting portion 30 of support 13.

In actual use, the same device 1 is fitted integrally to casing 4, inside seat 3 and immediately below drawer 2, be it a slide-out drawer 2a or swing-out drawer 2b, the only difference being that, in the case of drawer 2a, support 13 is positioned with axis of rotation B parallel to the plane of drawer 2a and perpendicular to rack 15, whereas, in the case of drawer 2b, support 13 is rotated 90° clockwise with respect to drawer 2a so that, in the example shown, axis B is parallel to the axis of rotation A of drawer 2b and therefore perpendicular to the plane of drawer 2b; in which case, the radius of curvature of rack 18 is centred about axis A.

The invention claimed is:

1. A device for automatic extraction of a drawer from a seat, in which the drawer is normally housed in a withdrawn position, said device comprising:
    a releasable locking device for locking the drawer in the withdrawn position;
    a support and an elastic element housed therein for pushing the drawer into an extracted position, in which the drawer projects at least partially from said seat;
    a braking element seated in said support for opposing movement of the drawer; and
    a toothed pinion rotatable about a horizontal axis of rotation and fitted idly to the support so that at least one predetermined circumferential portion of teeth of the pinion is exposed for meshing with a corresponding toothed rack of the drawer;
    wherein
    said pinion is disposed coaxially with both the elastic element and the braking element, and directly connected with both said elastic element and said braking element to be driven and braked by said elastic element and said braking element, respectively; and
    said releasable locking device is configured to directly engage a corresponding locking member of the drawer to maintain the drawer in the withdrawn position.

2. The device as claimed in claim 1, wherein said elastic element comprises an elastic metal strip made coiled about the axis of rotation of the pinion.

3. The device as claimed in claim 2, wherein said pinion is connected directly with said braking element on a first side thereof, and is connected directly with said elastic element on a second side thereof opposite the first side.

4. The device as claimed in claim 3, wherein said second side of the pinion is fitted with a sleeve coaxial with the axis of rotation of the pinion, and housing the coiled metal strip;

- a radially outermost end of said metal strip being bent radially outwards and engaging a circumferential, peripheral recess of said sleeve.

5. The device as claimed in claim 4, wherein said support comprises

- a supporting portion substantially perpendicular to the axis of rotation of the pinion and facing said first side of the pinion;
- a pinion housing defined by two circumferentially spaced tabs which project, parallel to the axis of rotation of the pinion, from said supporting portion on the same side as the pinion, and between which the pinion is supported idly by said supporting portion;
- an axial seat, for said braking element, formed on the supporting portion on the same side as said tabs; and
- a cover which clicks onto said tabs in a position facing said supporting portion and on the opposite side thereof with respect to the pinion, so as to axially close said pinion housing and said pinion fitted with said sleeve.

6. The device as claimed in claim 5, wherein a radially innermost end of the coiled metal strip is bent radially inwards and engages said cover.

7. The device as claimed in claim 5, wherein said braking element comprises a device fitted coaxially with the axis of rotation of the pinion by a hinge.

8. The device as claimed in claim 5, wherein said braking element comprises first and second cylindrical members coaxial with the axis of rotation of the pinion, and fitted to each other so as to be rotatable with respect to each other about the axis of the pinion in opposition to the torque exerted by the elastic element;

- the first cylindrical member being housed in said axial seat on the supporting portion; and
- the second cylindrical member projecting axially from said axial seat and engaging said pinion.

9. The A device as claimed in claim 1, wherein said releasable locking device is snapped in a transverse seat of the support.

10. The device as claimed in claim 9, wherein said transverse seat has an opening oriented in a direction transverse to the axis of rotation of the pinion for receiving said releasable locking device therethrough.

11. The device as claimed in claim 10, wherein said releasable locking device includes a push-push mechanism configured to be actuable by the corresponding locking member of the drawer moving in the transverse direction.

12. In combination, a drawer; and a device for automatic extraction of the drawer from a seat, in which the drawer is normally housed in a withdrawn position;

wherein said device comprises:

- a releasable locking device for locking the drawer in the withdrawn position;
- an elastic element for pushing the drawer into an extracted position, in which the drawer projects at least partially from said seat;
- a braking element for opposing movement of the drawer;
- a support housing said elastic element and said braking element; and
- a toothed pinion rotatable about a horizontal axis of rotation and fitted idly to the support so that at least one predetermined circumferential portion of teeth of the pinion is exposed for meshing with a corresponding toothed rack of the drawer;

wherein said pinion is disposed coaxially with both the elastic element and the braking element, and directly connected with both said elastic element and said braking element to be driven and braked by said elastic element and said braking element, respectively; and said releasable locking device comprises:

- a push-push mechanism actuable by the corresponding locking member which is a catch; and
- jaws openable and closable by the push-push mechanism for releasing and gripping, respectively, the catch inserted between said jaws.

13. The combination as claimed in claim 12, wherein said releasable locking device is snapped in a transverse seat of the support;

said transverse seat has an opening oriented in a direction transverse to the axis of rotation of the pinion for receiving said releasable locking device therethrough; and said push-push mechanism is actuable by the catch moving in the transverse direction.

* * * * *